United States Patent [19]

Gunderson

[11] 4,284,068

[45] * Aug. 18, 1981

[54] SOLAR HEAT COLLECTOR FOR GASSES

[76] Inventor: Charles F. Gunderson, 1622 N. Marconi Rd., Belmar, N.J. 07719

[ * ] Notice: The portion of the term of this patent subsequent to May 29, 1996, has been disclaimed.

[21] Appl. No.: 42,962

[22] Filed: May 29, 1979

Related U.S. Application Data

[63] Continuation-in-part of Ser. No. 815,208, Aug. 13, 1977, Pat. No. 4,156,420, which is a continuation-in-part of Ser. No. 566,730, Apr. 10, 1975, abandoned.

[51] Int. Cl.$^3$ ............................................. F24J 3/02
[52] U.S. Cl. ................................. 126/438; 126/443; 126/446
[58] Field of Search ............... 126/438, 450, 442, 443, 126/446, 432, 449, 417

[56] References Cited

U.S. PATENT DOCUMENTS 4,038,965  8/1977  Lyon ............................... 126/446
4,121,565  10/1978  Grisbrook ........................ 126/449
4,156,420  5/1979  Gunderson ..................... 126/443 X Primary Examiner—James C. Yeung
Assistant Examiner—Larry Jones
Attorney, Agent, or Firm—Charles F. Gunderson

[57] ABSTRACT

A solar heat collector has a plurality of collector elements mounted in a fixed plane, parallel and adjacent to each other. Each of the collector elements has an outer casing of transparent material with one side facing the source of solar energy, and an other side coated with a reflective material. An inner tubular section of darkened material is positioned between the axis of the outer tubular casing and the reflective material of the other side of the outer tubular casing, whereat substantially all of the solar energy is refracted or reflected by the outer casing or the reflective material. The inner tubular section is designed to accommodate and heat a gaseous medium. The upper and lower ends of the inner tubes are connected to a system for storing or using the heated gasses after they are warmed by the solar energy.

11 Claims, 5 Drawing Figures

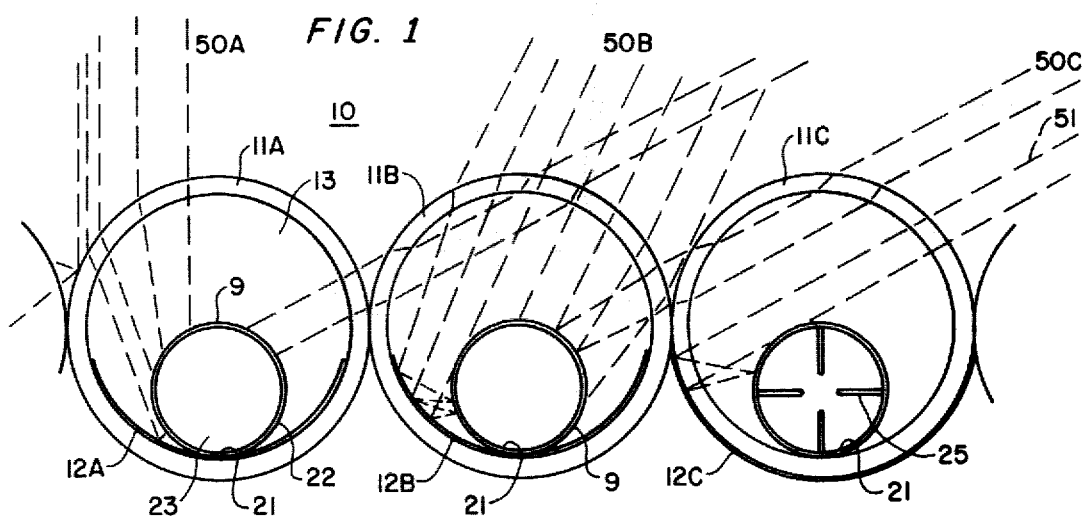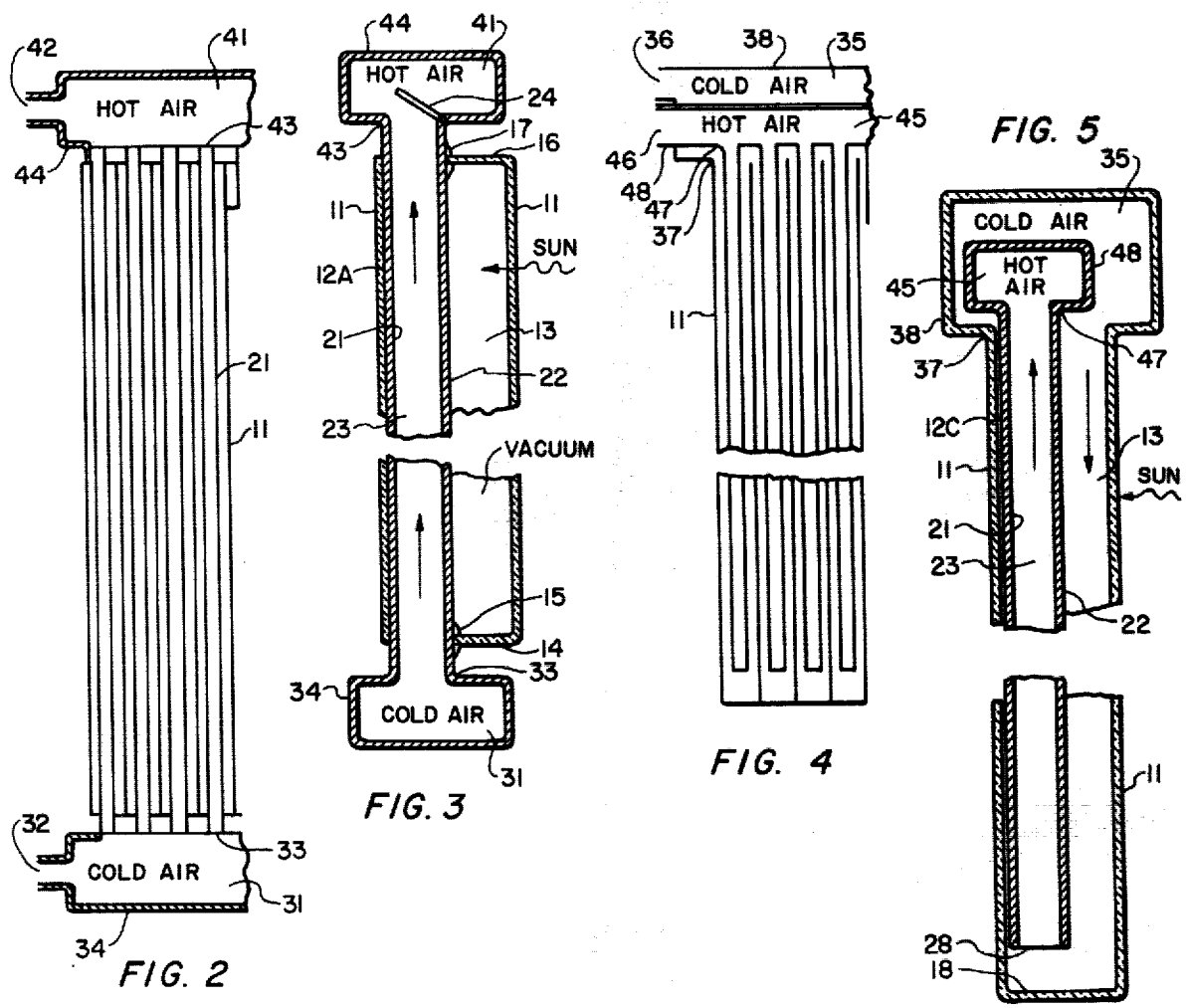

SOLAR HEAT COLLECTOR FOR GASSES

CROSS REFERENCE TO RELATED APPLICATIONS

This invention is a continuation-in-part of the copending application, Ser. No. 815,208, of the applicant Charles F. Gunderson, for a "SOLAR HEAT COLLECTOR," filed Aug. 13, 1977, issued on May 29th, 1979 as U.S. Pat. No. 4,156,420, which is a continuation-in-part of Ser. No. 566,730, filed Apr. 10, 1975, now abandoned.

FIELD OF THE INVENTION

This invention relates to solar heat collectors and particularly to solar heat collectors that use a gas to absorb solar energy in the form of heat, and transmit it to a remote point for storage or use. More particularly, this invention relates to a solar heat collector using a series of fixed units, mounted vertically, side-by-side, in a plane perpendicular to the sun's orbit, and having both refractive and reflective facilities for the collection of the solar heat energy.

DESCRIPTION OF THE PRIOR ART

There have been very-many devices proposed for the collection of solar energy, and, as time goes on, there would appear to be an ever-increasing need for such devices to take the place of the diminishing sources of fossil fuel energy.

The basic, practical, solar heat collectors in use today, particularly in private homes, use a form of flat plate of highly-conductive material with tubes of other heat-conducting means closely attached to the plates. The flat plates have a black, heat absorbing coating to collect the solar heat energy and fluids circulating through the tubes carry the heat off to a storage area or other destination.

Other types of collectors have reflective or refractive elements to focus the sun's rays on a collecting element. Many of these are in the form of elongated units with the reflective or refractive portions focusing on an elongated collecting tube. However, almost all of these units must be focused toward the sun at all times.

Most of these elongated units may be further classified as being mounted in a vertical or a horizontal plane. Those mounted in a horizontal plane, such as seen in ABBOT'S "SOLAR HEATER" in U.S. Pat. No. 1,946,184; or SLEEPER'S "INFLATABLE SOLAR ENERGY COLLECTOR" in U.S. Pat. No. 3,125,091 may be adjusted in elevation from day to day to maintain focus on the sun's orbit, but must have circulating pumps, since they cannot in any way take advantage of gravity flow of the fluids as they are being heated.

Those elongated units mounted in a vertical plane, such as seen in NIEDERLE's "SOLAR WATER HEATER" in U.S. Pat. No. 1,989,999; or ABBOT's "SOLAR DISTILLING APPARATUS" in U.S. Pat. No. 2,141,330, may have a natural gravity flow, but they must all be rotated constantly, either as individual units or as an array, to follow the daily orbit of the sun. These units, of either type, tend to be bulky, expensive to build, awkward to manipulate and must lose efficiency in the energy required for the pumping or focusing motors and machinery. Other devices such as GODEL's "SOLAR COLLECTOR" in U.S. Pat. No. 3,227,153 may also be mounted in a vertical plane, and may not require focusing, but cannot function without a pump.

An exception to this is seen in the vertically-mounted, gravity-operated, elongated collector system, described in my above-mentioned, copending patent application, that can maintain its focus of the solar energy on its collector tubes during the useful orbit of the sun without rotation of the individual collectors or of the bank of collectors.

However, this collector is directed and adapted primarily to the use of liquids, as are most of the collectors described in the prior art, and as with all liquid-transfer solar heat collectors, it has the limitations inherent in all liquids. If water is used, to be simply adapted to domestic water heating systems, there are the problems of freezing or boiling; either of which may damage the system. This can only be avoided by complex controls and valve systems.

If antifreeze of similar solutions are used to avoid the freezing or boiling, the liquids become incompatible with domestic water systems, and secondary heat exchangers or transfer systems must be provided to transfer the heat energy from one liquid medium to another.

These liquid systems are usually adapted to transfer to and store their heat energy into another liquid storage system, which may be similar to a swimming pool, and which may be fairly readily available. However, liquid systems, and their heat exchangers are usually most adaptable to the well-known hot-water heating systems, and cannot readily be adapted to the equally well-known hot-air heating systems, which, unlike hot-water systems, can also be used for air conditioning.

Solar systems for heating air are also being developed, and usually circulate the hot air through a chamber filled with rocks or the like to store the heat energy. This may not be as efficient, in some ways, since dry air is a poor conductor of heat, and it is hard to get the air in contact with a heated collecting surface to be warmed as well as to give off its heat to another medium. However, the hot air system does avoid the inevitable problems of storing water, hydrostatic pressure, leakage, and maintenance—not to mention bacteria, mold, dampness, and insects that thrive on dampness. An air system would have no freezing, boiling or corrosion problems, and simpler valves and controls. Also it is readily available.

It is therefore an object of this invention to provide a solar collector for heating gasses.

It is a further object of this invention to provide a solar collector for heating gasses that focuses the solar energy into a given area without any need for mechanical rotation of any of its elements.

It is a further object of this invention to provide a solar collector for heating gasses that has its collector elements mounted in a vertical plane to provide gravity flow of the gasses, and that may function without the aid of pumps or other mechanical devices.

It is a further object of this invention to provide a solar collector for heating gasses that provides close contact of the gasses with the solar-heated elements to insure the maximum transfer of heat energy.

These and other objects of this invention are provided by:

SUMMARY OF THE INVENTION

A solar heat collector that uses elongated, tubular, outer casings in a fixed position with respect to the solar orbit, surrounding inner tubular sections carrying gasses to be heated. The outer casings are highly transparent to admit as much solar energy as possible. The walls of the outer casings are of sufficient thickness to be structurally self supporting, and to withstand a high degree of vacuum, and they may have a relatively-high refractive index to partially focus the solar energy on or towards the inner tubular sections that are of highly conductive material and have dark, heat-absorbing surfaces. One of the sides of the outer casings faces the sun. The other sides of the outer casings are coated with a highly-reflective material to reflect any solar heat energy that may by-pass the inner tubular sections, back to the inner tubular sections. Each of the outer casings is mounted in a substantially vertical plane, and the solar heat collector would, normally, consist of a plurality of such casings, or units, mounted side-by-side in a fixed plane aproximately normal to the noonday, winter sun, or perpendicular to the plane of the sun's orbit. The upper and lower ends of the inner tubes are connected to a system for storing or using the heated gasses after they are warmed by the solar energy.

BRIEF DESCRIPTION OF THE DRAWINGS

FIG. 1 shows an enlarged cross section of a portion of a typical solar heat collector in accordance with this invention.

FIG. 2 shows cross section of a front view of a series of collectors of one species of this invention.

FIG. 3 shows a cross section of an enlarged side view of one of the collector elements of FIG. 2.

FIG. 4 shows a cross section of a front view of a series of collectors of another species of this invention; and FIG. 5 shows a cross section of an enlarged side view of one of the collector elements of FIG. 4.

DESCRIPTION OF THE PREFERRED EMBODIMENT

Referring now more particularly to FIG. 1, a bank of solar heat collectors 10 has elongated, tubular outer casings 11A–C with reflective surfaces 12A–C away from the sun. The casings 11 surround outer cavities such as 13. Elongated, tubular inner sections such as 21 have darkened surfaces 22 and enclose inner cavities such as 23. Vanes such as 25 may be positioned within the inner cavities. Solar rays such as 50A–C and 51 illustrate certain angles of incidence of the solar energy. FIG. 2 shows a front view of a bank of one species of such collectors, also in cross section, at a much reduced scale, with the same elements similarly numbered. FIG. 2 shows a first manner of coupling the collector elements 21 to a cold air plenum 31, which has a cold air input 32. This has couplings 33 between the casing 34 of the plenum and the lower ends of the inner sections 21. The couplings 43 between the upper ends of the inner sections and the casings 44 of the hot air plenum 41 are also seen, along with the hot air output 42.

These couplings are more clearly seen in FIG. 3, which is an enlarged side view, also in cross section, of one of the collector elements of the species of FIG. 2, with the same elements, again, similarly numbered. This figure shows, more clearly, the couplings 33 and 43 mentioned above. This figure also shows the lower end 14 of an outer casing 11 sealed at 15 to the lower end of the elongated inner section 21, and the upper end 16 of the outer casing 11 sealed at 17 to the upper end of the inner section. FIG. 3 also shows a valve 24 to prevent the reversal of the flow of air.

FIG. 4 shows a front view of a bank of another species of the collectors, at a much reduced scale, with similar elements again similarly numbered. The cold air plenum 35 is here at the upper end, along with the hot air plenum 45, and the casing 38 of the cold air plenum 35 is connected to the upper ends of the outer casings 11, as at 37, while the casing 48 of the hot air plenum 45 is coupled, as at 47, to the upper ends of the inner section 21.

This is seen more clearly in the enlarged side view in FIG. 5, also in cross section, of one of the collector elements of FIG. 4. FIG. 5 shows more clearly a lower end closure 18 of the outer casing 11 and the coupling 37 of the upper end of the outer casing 11 and the coupling 37 of the upper end of the outer casing to the cold air plenum casing 38. The casing 48 of the hot air plenum 45 is also seen coupled at 47 to the upper ends of the inner section 21.

In operation, the rays of solar energy 50, in a plane perpendicular to the collectors, strike the collectors 11 as shown in FIG. 1. The direct noon-day solar rays would be as shown in element A, and would be symmetrical on both sides of the collector. Angled solar rays of late morning or early afternoon are shown in element B, and the most oblique, still-useable rays of early morning or late afternoon, are shown in element C. This illustrates how all of the sun's rays will be either refracted or reflected to impinge on the heat absorbing surface 22 of the inner collector section 21 during the useful orbit of the sun.

It should be noted that the angled solar rays may be reflected off an outer casing into an adjoining collector or may pass through the outer casing to an adjoining collector. In any case, substantially all of the solar energy reaches one of the collector elements 21 in one way or another.

It should be noted that if the inner section 21 were any smaller, or below the axis of its outer casing 11, the portion of the solar energy at the ray 51, for example, passing through the axis would be reflected back into space, and its energy would be lost. Conversely, any enlargement of the inner section 21 would not gain any additional solar energy and would only add expense, weight and inefficiency. In other words, any change in the size,—or the shape for that matter—or the position of the inner section would decrease efficiency.

Since these collectors should be mounted in a near-vertical plane—substantially normal to the plane of the solar winter orbit—the heated gasses within the inner sections 21 will tend to rise to cause circulation between the cold and hot air plenums which couple the collectors to the storage areas, not shown.

The parallel coupling of the sections, as shown, would be indicated because the relative size of the inner secions, in a practical embodiment of this device, would be small, and the parallel arrangement would provide the minimum impedance to the flow of air, and the best circulation.

The relatively small sizes of the inner sections would be dictated by practical mechanical consideration, since they must be a function of the size of the corresponding outer casings. Large outer casings would be heavier, more cumbersome, more subject to damage, and more difficult to replace. They would also be more difficult to seal, as well as to evacuate, and would require larger plenums, but they would provide larger inner sections. However, larger inner sections, while having less impedance to the flow of gasses, would also have less contact with the gasses and less heating effect.

Reducing the sizes of the outer and inner sections to increase the contact between the inner sections and the gasses must inevitably increase the impedance to, and reduce, the air flow, ultimately to an ineffectual amount. In other words there must be a compromise between the heating effect of the inner section and the free flow of the gasses or air.

Additional contact between the air and the heating medium may be achieved by vanes such as 25, projecting into the inner cavity 23. These vanes, also of highly conductive material to carry the heat from the walls of the highly conductive material of the inner sections further into the inner cavity. They may be of any convenient size and shape, and of any number. However, the compromise, must again, be the increase in heat exchange as against the inevitable decrease in air flow. These vanes may be axial, or they may be spiraled or may include other convolutions to agitate or swirl or otherwise bring the air as much as possible in contact with the sources of heat.

The sizes and thicknesses of the highly conductive tubing and of the vanes would be dictated by effective heat transfer as well as by cost. However, with the relatively low pressures involved and the low mass of the air, they can be much thinner than would necessary for a liquid heating collector.

The species of FIGS. 1-3 may have the upper and lower ends, 16 and 14 respectively, sealed around the inner sections 21 so that the outer cavities may be evacuated. This would provide virtually no convection losses in the outer cavities and a high efficiency for this relatively simple collector. The vacuum sealing of the outer and inner casing may be by any available techniques, including direct metal to glass seal, or conventional gaskets.

Problems arising due to the differences in expansion between the metal of the inner section and the glass or plastic of the outer casing may be overcome by the use of sylphons of other well-known techniques for accommodating the expansion of the various materials without compromising the vacuum in the outer cavity.

The coupling of the inner sections to the plenums such as 33 or 43 will probably be metal-to-metal, and may be a simple solder or glue joint since relatively low pressures are to be encountered. It is obvious that any secure pipe coupling may be used here. It would also be desirable to provide a coupling that can be changed, without too much difficulty, to permit the repair or replacement of a collector element.

The species of FIGS. 4 and 5 suggests that instead of sealing and evacuating the outer cavity 13, it may be connected so that cold air may be drawn down through the outer cavity 13 by the rising, warmed gasses in the inner cavity 23. This would have certain advantages, such as eliminating the need for metal-to-glass seals and expansion problems, as well as air pressure differential problems to maintain the vacuum. This would require less strength of the outer casing, as well as the inner section, and put both the cold air and the hot air output adjacent to each other.

The cold air, being a poor heat conductor, may have minimal heat losses through the glass of the outer casing, or between the heated surface of the inner section and the outer casing, and would, in fact, be preheated by the contact with the heat absorbing surface 22 of the inner section. In this species, the spacing between the lower, closed end 18 of the outer casing, and the lower open end 28 of the inner section should be sufficient to permit the free flow of air.

While any gasses may be heated in this solar collector within the limitations of materials that are available and pressures that may be required, it is assumed that the most commonly used gas would be air under atmospheric pressures. This is most readily available and would enhance the simplicity and adaptability of this collector.

While negative, or counterflow of air would not appear to be a problem in a system using these collectors, simple flaps such as 24 of FIG. 3 may be provided in any or all of the inner sections to be opened by the pressure of the hot air rising, and to close when there is no more heat coming in. Similar flaps or valves of well known types could also be used at the inputs or the outputs of the plenums.

The solar-heated hot air output may be connected directly to a hot air heating system to supplement or replace the conventional system during sunny hours, or the solar-heated hot air may be diverted to a heat storage bin of any well-known type, that may contain rocks, for example, as a heat storage medium. The size of such a storage facility will be dictated by the amount of heat available or desired, and by practical considerations. Obviously the larger the storage facility, the more heat energy that can be stored.

The size of the collectors, and the number of collector units will also be a matter of practical choice, involving the amount of heat required and the amount of heat storage available. Obviously, the more collectors, the more of the available solar heat that can be collected to be used or stored.

The primary target of this invention is to provide a natural, gravity flow of heated air, for economy and simplicity, and under ideal—or reasonably normal—conditions, this system would be self operating. However, where the existing system may already have a pump, it may certainly be used. Or, where complex air passages make natural gravity circulation inadequate, or where the performance in general may be improved by the addition of a pump, it would be quite easy to adapt one.

The reflective surfaces may be applied to the inside of the outer casings away from the sun, as shown in 12A and 12B of FIG. 1, or on the outside as shown in 12C. It should extend about half-way up in any case. The inner reflective coating can be applied by well-known techniques, and will be protected by the sealed container. The outer reflective coating can be similarly applied, or merely glued to the outer surface.

The logical connection of the units would be in parallel, as noted earlier, and it is assumed that the identical units would have the same flow. However, if, for any reason, there is variation in the flow, this can be compensated for mechanically by automatic or manual valves.

It is to be understood that I do not desire to be limited to the exact details of construction shown and described since obvious modifications will occur to a person skilled in the art.

What is claimed is:

1. A solar heat collector for gasses comprising at least one elongated, tubular, outer casing of transparent material; means for positioning said outer casing in a fixed plane substantially perpendicular to the winter solar orbit, with one cylindrical side of said outer casing facing said solar orbit, whereby a substantial portion of the solar heat energy impinging on said outer casing is refracted towards a given portion within said tubular outer casing, said given portion being located between the axis of said cylindrical side of said outer casing and the other side of said outer casing;

reflective means applied to said other side of said tubular outer casing;

a single, elongated tubular inner section of highly-conductive material, with a dark heat absorbing surface, positioned along said given portion within said outer tubular casing, said elongated tubular inner section having one side toward said solar orbit along the axis of said cylindrical side of said tubular outer casing, and an other side, away from said solar orbit, adjacent to said reflective means, whereby substantially all of said solar heat energy will be refracted or reflected to said tubular inner section during said solar orbit;

a gaseous medium contained within said elongated tubular section, and means for connecting said elongated tubular section to a system for using heated gasses.

2. A solar heat collector as in claim 1 having means for sealing the upper end of said outer casing to the upper end of said tubular inner section, and means for sealing the lower end of said outer casing to the lower end of said tubular inner section.

3. A solar heat collector as in claim 2 is evacuated the space between said outer casing and said tubular inner section.

4. A solar heat collector as in claim 2 having means such as sylphon tubing for compensating for the differences in thermal expansion between the material of said outer tubular casing of transparent material and said elongated tubular inner section of highly-conductive material.

5. A solar heat collector as in claim 1 having a plurality of said elongated tubular outer caasings mounted, side by side, in a plane perpendicular to that of said solar orbit.

6. A solar heat collector as in claim 5 having means for coupling the upper ends of said tubular inner sections together in parallel, and means for coupling the lower ends of said tubular inner sections together in parallel to provide a low impedance path for said gasses and to combine the solar heating effect of all of said tubes.

7. A solar heat collector for gasses comprising at least one elongated, tubular, outer casing of transparent material; means for positioning said outer casing in a fixed plane substantially perpendicular to the winter solar orbit, with one cylindrical side of said outer casing facing said solar orbit, whereby a substantial portion of the solar heat energy impinging on said outer casing is refracted towards a given portion within said tubular outer casing, said given portion being located between the axis of said cylindrical side of said outer casing and the other side of said outer casing;

reflective means applied to said other side of said tubular outer casing;

a single, elongated tubular inner section of highly-conductive material, with a dark heat-absorbing surface, positioned along said given portion within said outer tubular casing, said elongated tubular inner section having one side toward said solar orbit along the axis of said cylindrical side of said tubular outer casing, and an other side, away from said solar orbit, adjacent to said reflective means, whereby substantially all of said solar heat energy will be refracted or reflected to said tubular inner section during said solar orbit;

a gaseous medium contained within said elongated tubular section;

said tubular inner section having axial vanes of highly conductive material extending inwardly along the length of said tubular inner section to conduct heat away from said tubular inner section to provide a better contact between solar heated surfaces and said gaseous medium; and means for connecting said elongated tubular section to a system for using heated gasses.

8. A solar heat collector as in claim 7 wherein said axial vanes are spiraled along the inner portion of said tubular inner section to cause turbulence within said gasses to provide better contact between said gasses and said solar heated surfaces.

9. A solar heat collector for gasses comprising at least one elongated, tubular, outer casing of transparent material; means for positioning said outer casing in a fixed plane substantially perpendicular to the winter solar orbit, with one cylindrical side of said outer casing facing said solar orbit, whereby a substantial potion of the solar heat energy impinging on said outer casing is refracted towards a given portion within said tubular outer casing, said given portion being located between the axis of said cylindrical side of said outer casing and the other side of said outer casing;

reflective means applied to said other side of said tubular outer casing;

a single, elongated tubular inner section of highly-conductive material, with a dark heat-absorbing surface, positioned along said given portion within said outer tubular casing, said elongated tubular inner section having one side toward said solar orbit along the axis of said cylindrical side of said tubular outer casing, and an other side, away from said solar orbit, adjacent to said reflective means, whereby substantially all of said solar heat energy will be refracted or reflected to said tubular inner section during said solar orbit;

the lower end of said tubular inner section being terminated above the lower end of said tubular outer casing, said lower end of said tubular section being open;

means for sealing said lower end of said tubular outer casing; means for coupling the upper end of said tubular inner section to a hot air return system; and means for coupling the upper end of said tubular outer casing to a cold air input system, whereby said air being heated in said tubular inner section draws colder air down through said tubular outer casing.

10. A solar heat collector for gasses comprising at least one elongated, tubular, outer casing of transparent material; means for positioning said outer casing in a fixed plane substantially perpendicular to the winter solar orbit, with one cylindrical side of said outer casing facing said solar orbit, whereby a substantial portion of the solar heat energy impinging on said outer casing is refracted towards a given portion within said tubular outer casing, said given portion being located between the axis of said cylindrical side of said outer casing and the other side of said outer casing;

reflective means applied to said other side of said tubular outer casing;

a single, elongated tubular inner section of highly-conductive material, with a dark heat-absorbing surface, positioned along said given portion within said outer tubular casing, said elongated tubular inner section having one side toward said solar orbit along the axis of said cylindrical side of said tubular outer casing, and an other side, away from said solar orbit, adjacent to said reflective means, whereby substantially all of said solar heat energy will be refracted or reflected to said tubular inner section during said solar orbit;

a gaseous medium contained within said elongated tubular section;

a one-way valve mounted with each of said tubular sections to permit the low of said gasses only in an upwardly direction as said gasses are heated by said solar heat energy; and means for connecting said elongated tubular section to a system for using heated gasses.

11. A solar heat collector as in claim 10 having a one-way valve mounted within said means for connecting said elongated tubular sections to a system for using heated gasses.

* * * * *